United States Patent
Cao et al.

(10) Patent No.: US 9,580,650 B1
(45) Date of Patent: Feb. 28, 2017

(54) METHOD OF MANUFACTURING CE:YAG POLYCRYSTALLINE PHOSPHOR

(71) Applicant: DM Lighting Technologies Inc., Montclair, CA (US)

(72) Inventors: Dun-Hua Cao, Kunshan (CN); Yong-Jun Dong, Kunshan (CN); Yue-Shan Liang, Kunshan (CN)

(*) Notice: Subject to any disclaimer, the term of this patent is extended or adjusted under 35 U.S.C. 154(b) by 118 days.

(21) Appl. No.: 14/583,152

(22) Filed: Dec. 25, 2014

(51) Int. Cl.
*C04B 35/653* (2006.01)
*C09K 11/77* (2006.01)

(52) U.S. Cl.
CPC .................. *C09K 11/7774* (2013.01)

(58) Field of Classification Search
CPC .............. C04B 35/653; C04B 2235/3225; C04B 2235/3229; C04B 2235/658; C09K 11/7774
See application file for complete search history.

(56) References Cited

U.S. PATENT DOCUMENTS

| | | | |
|---|---|---|---|
| 2006/0250069 A1* | 11/2006 | Sakata | C04B 35/117 313/485 |
| 2007/0267646 A1 | 11/2007 | Wierer et al. | |
| 2009/0072700 A1* | 3/2009 | Kameshima | C03C 14/004 313/483 |
| 2009/0242919 A1 | 10/2009 | Lin et al. | |
| 2010/0084962 A1* | 4/2010 | Winkler | C09K 11/7774 313/484 |
| 2010/0294939 A1* | 11/2010 | Kuntz | C04B 35/01 250/361 R |
| 2011/0210658 A1* | 9/2011 | Pan | B32B 18/00 313/112 |
| 2011/0227477 A1* | 9/2011 | Zhang | B32B 18/00 313/503 |
| 2012/0223236 A1* | 9/2012 | Shah | C09K 11/7774 250/362 |
| 2012/0256533 A1* | 10/2012 | Seto | C04B 35/58085 313/498 |
| 2013/0244354 A1 | 9/2013 | Kundaliya et al. | |
| 2013/0306874 A1* | 11/2013 | Yoshikawa | C09K 11/7774 250/361 R |
| 2014/0209712 A1* | 7/2014 | Muthe | C04B 35/013 241/3 |
| 2014/0369022 A1* | 12/2014 | Wataya | C01F 17/0025 362/84 |
| 2015/0078010 A1 | 3/2015 | Kundaliya | |
| 2016/0025294 A1 | 1/2016 | Dijken et al. | |

FOREIGN PATENT DOCUMENTS

CN 1815765 9/2016

\* cited by examiner

*Primary Examiner* — Erin Snelting
(74) *Attorney, Agent, or Firm* — Klein, O'Neill & Singh, LLP

(57) ABSTRACT

A method of manufacturing Ce:YAG polycrystalline phosphor with the formula $(Y_{1-x-m}A_xCe_m)_3(Al_{1-y}B_y)_5O_{12}$; $0 \le x \le 1$, $0 \le y \le 1$, $0 \le m \le 0.05$; wherein A is one of Lu, Tb, Pr, La and Gd; and wherein B is one of Ga, Ti, Mn, Cr and Zr.

3 Claims, 1 Drawing Sheet

METHOD OF MANUFACTURING CE:YAG POLYCRYSTALLINE PHOSPHOR

FIELD OF THE INVENTION

The invention is directed to the field of LED manufacture, especially to a method of manufacturing Ce:YAG polycrystalline phosphor.

BACKGROUND

LED is one sort of solid semiconductor device, which is able to directly convert electric energy to light energy. Compared with traditional incandescent and fluorescent light, white LED possesses the advantages of low power consumption, high luminous efficiency, long working life, energy conservation and environmental friendliness, etc. Therefore, not only is it widely used in the field of daily lighting, but it also steps into the field of display equipment. Currently, the techniques of acquiring white LED can be divided into two classes: (1) adopting the combination of three LED chips that emit red, green and blue light; (2) adopting a monochromatic (blue or ultraviolet) LED chip to excite an appropriate fluorescent material. At present, white LED mainly utilizes the combination of a blue LED chip and phosphor powder $Ce^{3+}$:YAG which can be excited effectively by blue light and emit yellow light, and then the lens principle is used to mix complementary yellow and blue light so as to provide white light.

For a structure that uses phosphor powder packaging, there are the following disadvantages: 1) phosphor powder excitation efficiency and light conversion efficiency are low; 2) the problem of inhomogeneity of phosphor particle size and dispersion cannot be effectively solved; 3) phosphor powder lacks a red luminescent component, making it hard to manufacture white LED with a low color temperature and a high color rendering index; 4) the light failure of phosphor powder is tremendous, resulting in short working life of white LED; 5) the poor physicochemical properties of phosphor powder fail to meet the development of high-power LED.

SUMMARY

The technical problem that the invention is intended to solve is to overcome the defects in the prior art by providing a method of manufacturing Ce:YAG polycrystalline phosphor which possesses good optical properties and can be used in producing white LED.

To solve the problem above, the invention provides a method of manufacturing Ce:YAG polycrystalline phosphor. This crystal is of the following formula:

$$(Y_{1-x-m}A_xCe_m)_3(Al_{1-y}B_y)_5O_{12}$$

$0 \leq x \leq 1$, $0 \leq y \leq 1$, $0 \leq m \leq 0.05$
wherein A is one of Lu, Tb, Pr, La and Gd; and wherein B is one of Ga, Ti, Mn, Cr and Zr.

The method includes the following steps:
1) proportioned raw materials are mixed well (e.g., homogenously) and compressed into a cake;
2) the cake is fired at 1200-1400° C. under reducing or inert atmosphere for 10-20 hours, and placed into a crucible after sintered into a block;
3) the crucible is heated to 1970° C. under reducing or inert atmosphere to melt the raw materials by induction heating or resistance heating; the temperature is further increased by 50-100° C. on this basis to make the melt maintain at this temperature for 2-10 hours in a superheated state, allowing the materials to be mixed by convection;
4) the temperature is decreased to the melting point of the raw materials, namely 1970° C., then cooled down to room temperature gradually according to a staged cooling down procedure in 10-20 hours in order to obtain Ce:YAG polycrystalline phosphor after cooling down.

In step 4), the staged cooling down procedure includes:
Stage 1, the temperature is decreased to 1200° C. from 1970° C. over 4-8 hours;
Stage 2, the temperature is decreased to room temperature from 1200° C. over 6-9 hours.

In step 4), the staged cooling down procedure includes:
Stage 1, the temperature is decreased to 1600° C. from 1970° C. over 6-8 hours;
Stage 2, the temperature is decreased to 1000° C. from 1600° C. over 5-7 hours;
Stage 3, the temperature is decreased to room temperature from 1000° C. over 5-7 hours.

Compared with the prior art, the Ce:YAG polycrystalline phosphor made by the method of the invention has the following advantageous effects:
1) this Ce:YAG polycrystalline phosphor possesses good optical efficiency, high growth rate and low cost, making it a promising fluorescent material used in white LED;
2) this Ce:YAG polycrystal can be doped with high concentration of cerium ion; the actual doping concentration of cerium ion in Ce:YAG polycrystal can be higher than 1%;
3) cracking is not a problem for the polycrystal during the process of its growth which has low requirement and short cycle, significantly reducing the manufacturing cost and improving the economic benefit.

BRIEF DESCRIPTION OF THE DRAWING(S)

DETAILED DESCRIPTION

In order to make the technical solution of the invention better understood by those skilled in the art, the invention is further illustrated with reference to the embodiments as follows.

Figure 1:
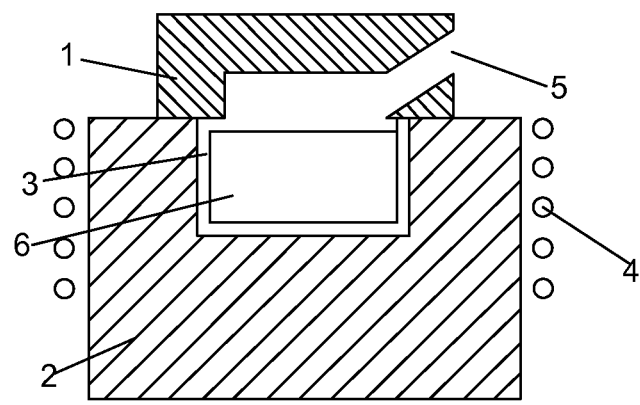
FIG. 1 is the schematic diagram of the heating device of the invention.
Figure 2:
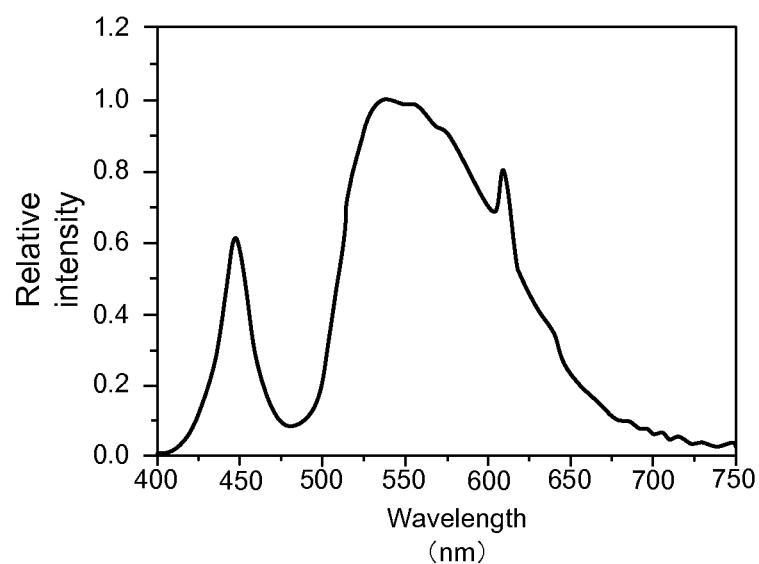
FIG. 2 is the relative energy distribution curve of the polycrystal in Example 1 which is excited by blue LED.

As shown in FIG. 1, the heating device of the invention includes a crucible 3 and an insulating layer 2. An induction coil 4 is twined around the insulating layer 2 from outside. Polycrystal 6 is produced inside the crucible 3. The crucible 3 is covered by an insulating hood 1. There is an observation port 5 through the insulating hood 1.

Example 1

The raw materials are weighed according to the proportion based on $(Y_{0.98}Ce_{0.02})_3Al_5O_{12}$. 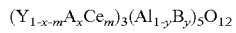 The raw materials are then mixed and compressed into a cake. The cake is fired at 1400° C. under inert atmosphere for 15 hours and placed into a crucible after sintered into a block. Induction heating method is applied to heat the crucible to 1970° C. under inert atmosphere to melt the raw materials. Then the temperature is further increased by 50° C. to make the melt maintain at this temperature for 2 hours in a superheated state. The temperature is decreased to 1970° C. and a two-stage procedure of 15 hours in total is used for cooling. The first stage is conducted for 7 hours, from 1970° C. to 1200° C.

The second stage is conducted for 8 hours, from 1200° C. to room temperature. After cooling down, yellow $(Y_{0.98}Ce_{0.02})_3Al_5O_{12}$ polycrystalline phosphor is obtained.

Example 2

The raw materials are weighed according to the proportion based on $(Y_{0.79}Gd_{0.2}Ce_{0.01})_3(Al_{0.998}Mn_{0.002})_5O_{12}$. The raw materials are then mixed and compressed into a cake. The cake is fired at 1300° C. under inert atmosphere for 20 hours and placed into a crucible after sintered into a block. Induction heating method is applied to heat the crucible to 1970° C. under inert atmosphere to melt the raw materials. Then the temperature is further increased by 50° C. to make the melt maintain at this temperature for 10 hours in a superheated state. The temperature is decreased to 1970° C. and a three-stage procedure of 20 hours in total is used for cooling. The first stage is conducted for 7 hours, from 1970° C. to 1600° C. The second stage is conducted for 6.5 hours, from 1600° C. to 1000° C. The third stage is conducted for 6.5 hours, from 1000° C. to room temperature. After cooling down, yellow green $(Y_{0.69}Tb_{0.3}Ce_{0.01})_3(Al_{0.998}Mn_{0.002})_5O_{12}$ polycrystalline phosphor is obtained.

Example 3

The raw materials are weighed according to the proportion based on $(Y_{0.685}Tb_{0.3}Ce_{0.015})_3(Al_{0.999}Cr_{0.001})_5O_{12}$. The raw materials are then mixed and compressed into a cake. The cake is fired at 1400° C. under reducing atmosphere for 10 hours and placed into a crucible after sintered into a block. Resistance heating method is applied to heat the crucible to 1970° C. under reducing atmosphere to melt the raw materials. Then the temperature is further increased by 80° C. to make the melt maintain at this temperature for 4 hours in a superheated state. The temperature is decreased to 1970° C. and a three-stage procedure of 17 hours in total is used for cooling. The first stage is conducted for 6 hours, from 1970° C. to 1600° C. The second stage is conducted for 6 hours, from 1600° C. to 1000° C. The third stage is conducted for 5 hours, from 1000° C. to room temperature. After cooling down, orange $(Y_{0.685}Tb_{0.3}Ce_{0.015})_3(Al_{0.999}Cr_{0.001})_5O_{12}$ polycrystalline phosphor is obtained.

What is claimed is:

1. A method of manufacturing Ce:YAG polycrystalline phosphor, wherein the crystal is of the following formula:

$$(Y_{1-x-m}A_xCe_m)_3(Al_{1-y}B_y)_5O_{12}$$

$0 \leq x \leq 1$, $0 \leq y \leq 1$, $0 \leq m \leq 0.05$ wherein A is one of Lu, Tb, Pr, La and Gd; and wherein B is one of Ga, Ti, Mn, Cr and Zr;

wherein the method includes the following steps:
1) proportioned raw materials are mixed and compressed into a cake;
2) the cake is fired at 1200-1400° C. under reducing or inert atmosphere for 10-20 hours, and placed into a crucible after sintered into a block;
3) the crucible is heated to a melting temperature under reducing or inert atmosphere to melt the raw materials by induction heating or resistance heating; and the temperature is further increased by 50-100° C. to maintain the melt of the raw material for 2-10 hours in a superheated state, allowing the raw materials to be mixed by convection;
4) the temperature is decreased to the melting point of the raw materials, then cooled down to room temperature gradually according to a staged cooling down procedure over the course of 10-20 hours in order to obtain Ce:YAG polycrystalline phosphor after cooling down.

2. The method of manufacturing Ce:YAG polycrystalline phosphor according to claim 1, wherein in step 4), the staged cooling down procedure includes:

Stage 1, the temperature is decreased to 1200° C. from 1970° C. over 4-8 hours;

Stage 2, the temperature is decreased to room temperature from 1200° C. over 6-9 hours.

3. The method of manufacturing Ce:YAG polycrystalline phosphor according to claim 1, wherein in step 4), the staged cooling down procedure includes:

Stage 1, the temperature is decreased to 1600° C. from 1970° C. over 6-8 hours;

Stage 2, the temperature is decreased to 1000° C. from 1600° C. over 5-7 hours;

Stage 3, the temperature is decreased to room temperature from 1000° C. over 5-7 hours.

* * * * *